3,399,229
PROCESS FOR THE PRODUCTION OF HYDROXY-ALKYL ESTERS OF THE α,β - UNSATURATED CARBOXYLIC ACIDS
Wilhelm Kunze, Frankfurt am Main-Fechenheim, Hans-willi von Brachel, Offenbach am Main, and Hans Gattner, Frankfurt am Main-Fechenheim, Germany, assignors to Cassella Farbwerke Mainkur Aktiengesellschaft, Frankfurt am Main-Fechenheim, Germany, a company of Germany
No Drawing. Filed Mar. 9, 1966, Ser. No. 532,849
Claims priority, application Germany, Apr. 3, 1965, C 35,504
6 Claims. (Cl. 260—485)

ABSTRACT OF THE DISCLOSURE

Production of hydroxyalkyl esters of α,β-unsaturated carboxylic acids by catalytic addition of alkylene oxides to said acids in the presence of hexahydrates of chromium trihalides as the catalyst.

---

This invention relates to an improvement in the process for the production of hydroxyalkyl esters of α,β-unsaturated carboxylic acids. More particularly, it relates to an improvement in the production of hydroxyalkyl esters of α,β-unsaturated carboxylic acids by catalytical addition of alkylene oxides to α,β-unsaturated carboxylic acids, which comprises using as catalysts hexahydrates of chromium trihalides.

It is known that hydroxyalkyl esters, of α,β-unsaturated carboxylic acids can be prepared by the addition of alkylene oxides in the presence of catalysts. As catalysts have been employed on the one hand amines, on the other hand anhydrous halides of iron, aluminium, and chromium. The employment of amines according to U.S. patent specifications 2,819,296 and 2,484,487 requires operating in pressure vessels. Working with halides of trivalent metals, for example, with ferric chloride according to British Patent 871,767 or with aluminium chloride according to U.S. Patent 3,150,167 necessitates the utilization of anhydrous acids, because, otherwise, the catalyst becomes either inefficient as is the case with aluminium chloride or the yield is reduced as is in the employment of ferric chloride. The preparation of anhydrous α,β-unsaturated carboxylic acids, however, requires an additional operation.

We now have found that alkylene oxides can be added, with very good yields, to α,β-unsaturated carboxylic acids that may further contain up to 5% of water by using as catalysts the hexahydrates of chromium trichloride or chromium tribromide.

α,β-unsaturated carboxylic acids especially suited for the process of the present invention are acrylic acid and acrylic acids that are substituted, in α- or β-position, by halogen or alkyl radicals, such as methyl, ethyl, propyl, or heptyl, moreover, there are suited maleic or fumaric acid and the monoesters thereof and maleic or fumaric acids substituted by halogen or alkyl radicals and the monoesters thereof.

As alkylene oxides suitable for the addition, i.e. the formation of esters, there may be mentioned, for example, those alkylene oxides, which are derived from straight chain, branched or cyclic olefines, such as ethylene, propylene, butylene, isobutylene, heptylene, cyclohexane, or styrol oxide, moreover epichlorohydrin and glycide ethers of monohydric alcohols.

The catalysts utilizable under the present invention possess, even when used in very small amounts, as excellent activity, which fact is all the more surprising as the anhydrous halides of chromium, such as, for example, the violet sublimated chromium trichloride, catalyze the addition of alkylene oxides but weakly. The new catalysts can be employed in such small amounts that they need not be removed by distillation or other manipulations.

The hydroxyalkyl esters that are obtained are only very weakly green colored and may be used straightway for the production of copolymers, since the small amounts of the inhibitors employed need not be removed previously. In contrast thereto, the yellowish products as are obtained in the employment of ferric chloride can virtually not be further treated to give polymerisates without previous distillation.

The advantages involved, i.e., employment of not entirely anhydrous carboxylic acids, workability of the hydroxyalkyl esters without previous distillation, are remarkable. Therefore, the process under the present invention represents an enrichment of the prior art.

The following examples are given for the purpose of illustrating the present invention. Where not otherwise stated the temperatures given are in degree centigrade and all parts are parts by weight.

Example 1

180 parts methacrylic acid of a technical grade of 99%, 0.03 part hydroquinone, and 0.144 part chromium trichloride-hexahydrate are heated to 85°. At this temperature, ethylene oxide is introduced, whilst stirring. After about 15 hours the reaction is completed. 280 parts methacrylic acid hydroxyethyl ester are obtained that contain about 1.5% of free methacrylic acid. The product is weakly green colored and can be used directly for polymerisation purposes.

The operation may also be effected by starting with 60 parts methacrylic acid and 0.144 part chromium trichloride-hexahydrate—whereby the pick-up of ethylene oxide takes place more rapidly—and by gradually adding the remaining 120 parts methacrylic acid, whilst the ethylene oxide is being introduced.

Example 2

147 parts acrylic acid of a technical grade of 98% are admixed with 0.075 part hydroquinone and 1 part chromium trichloride-hexahydrate. At a temperature of 70°, 130 parts propylene oxide are dropwise added in the course of 4 hours. After the addition has been completed, the mixture is stirred for a further 4 hours at 80–85°. The resultant acrylic acid β-hydroxypropyl ester having an acid content of 0.5% can be vacuum distilled; 245 parts of the product are obtained. Using 0.3 part chromium trichloride-hexahydrate, the resultant ester is only weakly colored and may be used directly for further treatment. The reaction time is extended to approximately 12 hours.

Example 3

176 parts methacrylic acid of a technical grade of 98%, 0.1 part hydroquinone, and 1.5 parts chromium trichloride-hexahydrate are heated to 80–85° and then 155 parts butylene oxide are introduced into the mixture within 4 hours. The addition being completed, the mixture is stirred for a further 2 hours at 85°. The reaction product, i.e. the methacrylic acid hydroxybutyl ester, boils at 82–86°/1.5 mm.; it contains less than 0.5% of free methacrylic acid. Using 0.4 part chromium trichloride-hexahydrate, the reaction time is approximately 14 hours. The resultant hydroxybutyl ester may be further treated without distillation.

Example 4

Within about 3 hours, 130 parts propylene oxide are dropwise added to 182 parts methacrylic acid of a technical grade of 95%, after the addition of 0.1 part hydroquinone and 1.5 parts chromium trichloride-hexahydrate.

The mixture is then stirred for another 3 hours at 75°, and the product is subsequently vacuum distilled. 275 parts methacrylic acid hydroxypropyl ester are obtained having a content of 1% of free methacrylic acid (=95% of the theoretical).

If, in place of the chromium trichloride, an equivalent amount of sublimated ferric chloride is used, 73% of the theoretical are obtained under the same reaction conditions.

Example 5

172 parts methacrylic acid, 0.1 part hydroquinone, 1 part chromium tribromide-hexahydrate are heated to 75–80° and at this temperature ethylene oxide is introduced. After the pickup of 96 parts ethylene oxide within about 4 hours, the content of free methacrylic acid is 1.1%. By means of distillation, 242 parts (=93% of the theoretical) methacrylic acid hydroxyethyl ester are obtained.

Example 6

172 parts crotonic acid are admixed with 2 parts chromium trichloride-hexahydrate. At 75–85°, 130 parts of propylene oxide are added dropwise within 3 hours. The mixture is stirred for a further 4 hours at 80–85°, and the product is then vacuum distilled. Thus, 270 parts crotonic acid hydroxypropyl ester are obtained having a boiling point of 116–122°/14 mm.

Example 7

49 parts maleic acid anhydride are converted into maleic acid by means of 9 parts water in 60 parts dioxane. After the addition of 0.05 part hydroquinone and 0.2 part chromium trichloride-hexahydrate, 80 parts propylene oxide are added at 80° within 6 hours and the mixture is stirred for a further 4 hours at 90°. After the dioxane and the excess of propylene oxide have been distilled off, 105 parts maleic acid di-(hydroxypropyl) ester are obtained that contain only just 0.5% of free maleic acid.

Example 8

At 70°, 19.6 parts maleic acid hydride are converted into the monoester by means of 26 parts 2-ethyl-hexanol-(1). After the addition of 0.01 part chromium trichloride-hexahydrate, 9 parts ethylene oxide are introduced at 90° within 10 hours, then the mixture is stirred for one more hour at 85–90°. 54 parts maleic acid monohydroxyethyl monoethylhexyl ester are obtained being free from acid.

The product cannot be distilled. It is useful as a valuable component in the production of copolymers, since it contains groups having softening and cross-linking properties.

It will be understood that this invention is susceptible to further modification and, accordingly, it is desired to comprehend such modifications within this invention as may fall within the scope of the appended claims.

We claim:
1. In the process for the production of hydroxyalkyl esters of $\alpha,\beta$-unsaturated carboxylic acids by catalytic addition of alkylene oxides to $\alpha,\beta$-unsaturated carboxylic acids the improvement which comprises using a catalysts the hexahydrates of chromium trihalides.

2. A process according to claim 1 which comprises using as catalyst a member of the group consisting of the hexahydrate of chromium trichloride and the hexahydrate of chromium tribromide.

3. A process according to claim 1 in which the $\alpha,\beta$-unsaturated carboxylic acid used as starting material is employed in such a form that it contains up to 5% of water.

4. The process according to claim 1 wherein the $\alpha,\beta$-unsaturated carboxylic acid is a member selected from the group consisting of acrylic acid, maleic acid, fumaric acid, monoesters of maleic acid, monoesters of fumaric acid, substituted acrylic, maleic and fumaric acids wherein the substituents are alkyl or halogen and substituted monoesters of maleic and fumaric acids wherein the substituents are in the acid group and are selected from the group consisting of halogen and alkyl.

5. The process according to claim 1 wherein the alkylene oxide is a member selected from the group consisting of ethylene oxide, propylene oxide, butylene oxide, isobutylene oxide, hepthylene oxide, cyclohexene oxide, styrol oxide, epichlorohydrin and glyceride ethers of monohydric alcohols.

6. The process according to claim 1 wherein the $\alpha,\beta$-unsaturated carboxylic acids are selected from the group consisting of acrylic acid, acrylic acid substituted in the $\alpha$ or $\beta$-position by halogen or alkyl having up to 5 carbon atoms, maleic acid and fumaric acid.

References Cited

UNITED STATES PATENTS 2,819,296  1/1958  Carnes et al. _____ 260—486

FOREIGN PATENTS 871,767  6/1961  Great Britain.

LORRAINE A. WEINBERGER, *Primary Examiner.*

A. P. HALLUIN, *Assistant Examiner.*